(12) United States Patent
Matsumoto

(10) Patent No.: US 8,078,748 B2
(45) Date of Patent: Dec. 13, 2011

(54) STREAMING DELIVERY METHOD AND SYSTEM, SERVER SYSTEM, TERMINAL, AND COMPUTER PROGRAM

(75) Inventor: Kiyoto Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 657 days.

(21) Appl. No.: 11/958,819

(22) Filed: Dec. 18, 2007

(65) Prior Publication Data
US 2008/0147873 A1 Jun. 19, 2008

(30) Foreign Application Priority Data
Dec. 18, 2006 (JP) ................................. 2006-339729

(51) Int. Cl.
*G06F 15/16* (2006.01)
(52) U.S. Cl. ........................................ 709/231; 709/203
(58) Field of Classification Search .................. 709/231, 709/203, 206, 246
See application file for complete search history.

(56) References Cited

U.S. PATENT DOCUMENTS
2006/0291506 A1* 12/2006 Cain ............................. 370/486
2007/0143493 A1* 6/2007 Mullig et al. ................. 709/232

FOREIGN PATENT DOCUMENTS
| JP | 2002073673 A | 3/2002 |
| JP | 2004140584 A | 5/2004 |
| JP | 2004227108 A | 8/2004 |

* cited by examiner

*Primary Examiner* — El Hadji Sall

(57) ABSTRACT

Video contents are delivered by a streaming method via a network to a client from a server with first and second storage areas. The method includes the steps of: delivering a first video content stored in the first storage area from the server to start playback thereof on the client; delivering a list of titles of the video contents stored in the second storage area from the server to be displayed on the client; changing the video content group stored in the second storage area; delivering data for updating the list from the server to be displayed the updated list on the client; receiving an input designating a second video content from the updated list at the client and notifying the server of the designation; and delivering the content B from the server in response to the notification designating the content B to be played back on the client.

18 Claims, 13 Drawing Sheets

STREAMING DELIVERY METHOD AND SYSTEM, SERVER SYSTEM, TERMINAL, AND COMPUTER PROGRAM

This application is based upon and claims the benefit of priority from Japanese patent application No. 2006-339729, filed on Dec. 18, 2006, the disclosure of which is incorporated herein in its entirety by reference.

BACKGROUND OF THE INVENTION

1. Field of the Invention

The present invention relates to a streaming delivery technology, and in particular to a streaming delivery technology for delivering contents while switching between a group of contents generated more frequently such as news programs and a group of contents generated less frequently such as movie programs.

2. Description of the Related Art

A streaming delivery system related to the present invention has been proposed, in which video contents are classified into two groups consisting for example of a combination of live broadcasting service and news delivery service and a combination of actual contents and advertisement contents so that delivery is performed according to the selected group.

For example, Japanese Laid-Open Patent Publication No. 2002-73673 describes a system designed to share a user's preference keyword for detecting contents between a live broadcasting service and a news delivery service. Japanese Laid-Open Patent Publication No. 2004-140584 describes a system designed to deliver and play back an advertisement content while temporarily interrupting the delivery and playback of an actual content. Japanese Laid-Open Patent Publication No. 2004-227108 describes a system which delivers recorded programs and advertisement information.

While some contents such as movies, dramas, documentaries, and music programs do not require prompt delivery so much, some contents such as news which are generated constantly should desirably be positively notified to users without delay after the generation thereof.

According to such systems related to the present invention, however, even if latest news becomes available for delivery during delivery of a movie, for example, the users are not allowed to be aware of that fact.

SUMMARY OF THE INVENTION

The present invention has been made in view of such circumstances, and it is an object of the present invention to provide a technique which is capable of notifying a user who is watching a content on a user terminal of a streaming delivery system of the fact that there are new contents available for delivery.

In order to achieve the above-mentioned object, the present invention provides a streaming delivery technology as described below.

The present invention provides a method of delivering video contents to a client from a server system comprising one or a plurality of servers via a network by streaming, wherein the server system comprises a first storage area and a second storage area. The streaming delivery method comprises the steps of: delivering to the client a first video content stored in the first storage area from the server system to start playback thereof on the client; delivering to the client a list of title information of at least one of video contents stored in the second storage area from the server system to display the list on the client; changing one or a plurality of video contents stored in the second storage area; delivering data for updating the list from the server system to display the updated list on the client; receiving at the client an input of a designation to designate one of the video contents in the updated list as a second video content; transmitting the designation from the client to the server system; and delivering the second video content from the server system to the client in response to the designation to play back the second video content on the client.

The server system may be composed of either a single server or a plurality of servers. For example, the first and second storage areas are defined as separate storage areas in a same storage device, so that both the first and second video contents are delivered by the same server. Alternatively, the first and second storage areas may be defined as separate storage devices which are provided in separate servers, respectively, so that the first video content is delivered by one of the servers while the second video content is delivered by the other server.

The delivery of the data for updating the list can be triggered by a request from the client. In this case, the client may transmit a request every predetermined period of time. Alternatively, the delivery of the data for updating the list may be triggered by addition or deletion of a video content to or from the second storage area.

In the streaming delivery method, the playback of the first video content on the client may be interrupted in response to the input designating the second video content from the updated list; and the playback of the first video content may be restarted on the client in response to completion of the playback of the second video content on the client and according to a position where the playback of the first video content is interrupted on the client.

More specifically, in response to an input designating the second video content, the client may interrupt the playback of the first video content while storing the position where the playback is interrupted. At the same time, the client may notify the server system of the interruption of playback of the first video content and start of playback of the second video content. In response to the notification, the server system starts delivery of the second video content. Receiving this, the client starts playing back the second video content, and upon completion of the delivery and the playback, the client transmits to the server system a request for restart of the delivery of the first video content together with the stored interruption position. In response to this request, the server system delivers to the client a stream of the first video content starting from the interruption position.

In the streaming delivery method, each of the video contents stored in the second storage area may have attribute information. The list may be composed of title information of some of the video contents stored in the second storage area, and some of the video contents may be selected from among the video contents stored in the second storage area based on the attribute information.

An example of the attribute information is time attribute information. In this manner, the video contents can be selectively displayed based on the time attribute information, and therefore a predetermined number of titles of the latest video news can be displayed.

Another example of the attribute information is classification attribute information indicating a category which the video content belongs to. In this case, since the video contents are selectively displayed based on the classification attribute information, only the news of specific fields can be selectively displayed on the client by classifying the video contents into fields such as politics, economics, cultures and sports, assigning corresponding classification attribute information to each of the video contents, and preliminarily designating specific fields for each of the clients.

The present invention also provides a server system for delivering video contents to a client via a network by streaming. The server system includes: a first and a second storage area; a streaming delivery controller that delivers video contents stored in the first and second storage areas to the client via the network by streaming; a list generator that generates a list of title information of at least one of the video contents stored in the second storage area; a list transmitter that delivers the list to the client via the network; and a list update unit for generating data for updating the list and delivering the same to the client via the network, wherein while a first video content stored in the first storage area is delivered to the client, delivery of a second video content contained in the list updated by the list update unit is started in response to a request that is sent from the client to designate the second video content. In the server system, while a first video content stored in the first storage area is delivered to the client, delivery of a second video content contained in the list updated by the list update unit is started in response to a request from the client.

In the server system, the delivery of the first video content to the client may be interrupted in response to notification designating the second video content, and the delivery of the first video content may be restarted in response to completion of the playback of the second video content at the client and according to the position at which the playback of the first video content is interrupted.

In the server system, each of the video contents stored in the second storage area may have attribute information. The list may be composed of title information of some of the video contents stored in the second storage area, and some of the video contents may be selected from among the video contents stored in the second storage area based on the attribute information.

An example of the attribute information is time attribute information. In this manner, the video contents can be selectively displayed based on the time attribute information, and therefore a predetermined number of titles of the latest video news can be displayed.

Another example of the attribute information is classification attribute information indicating a category which the video content belongs to. In this case, since the video contents are selectively displayed based on the classification attribute information, only the news of specific fields can be selectively displayed on the client by classifying the video contents into fields such as politics, economics, cultures and sports, assigning corresponding classification attribute information to each of the video contents, and preliminarily designating specific fields for each of the clients.

The present invention also provides a computer program executed by a computer to perform a method of delivering a video content to a client via a network. The method includes the steps of: delivering to a client a first video content stored in a first storage area accessible to the computer (step S7); delivering to the client a list of title information of at least one of video contents stored in a second storage area accessible to the computer to display the list on the client (step S10); delivering to the client data for updating the list in accordance with change in the video contents stored in the second storage area (step S10); receiving from the client a request that designates one of the second video contents in the updated list (step A1); and delivering to the client the second video content in response to the request (step A3).

This method may further includes steps of: interrupting the delivery of the first video content in response to the notification designating the second video content from the updated list (step A2); and restarting the delivery of the first video content to the client in response to completion of the playback of the second video content at the client and according to a position where the playback of the first video content is interrupted (step A7).

In this computer program each of the video contents stored in the second storage area may have attribute information. The list may be composed of title information of some of the video contents stored in the second storage area, and some of the video contents may be selected from among the video contents stored in the second storage area based on the attribute information.

An example of the attribute information is time attribute information. In this manner, the video contents can be selectively displayed based on the time attribute information, and therefore a predetermined number of titles of the latest video news can be displayed.

Another example of the attribute information is classification attribute information indicating a category which the video content belongs to. In this case, since the video contents are selectively displayed based on the classification attribute information, only the news of specific fields can be selectively displayed on the client by classifying the video contents into fields such as politics, economics, cultures and sports, assigning corresponding classification attribute information to each of the video contents, and preliminarily designating specific fields for each of the clients.

The present invention also provides a terminal receiving delivery of video contents from a server system comprising at least one server via a network by streaming. The terminal includes: a receiver that receives from the server system comprising a first and a second storage area delivery of a first video content stored in the first storage area to play back the first video content (screen portion 241); a receiver that receives from the server system delivery of a list of title information of at least one video content stored in the second storage area to display the list (news information display portion 242); a receiver that receives from the server system delivery of data for updating the list to display the updated list (news information display portion 242); an input device that receives an input designating a second video content from the updated list to deliver a request of the second video content to the server system (information input portion 230); and a player that plays back the second video content delivered from the server system in response to the request (screen portion 241).

In this terminal, the playback of the first video content may be interrupted in response to an input designating the second video content from the updated list, and the playback of the first video content may be restarted in response to completion of the playback of the second video content and according to a position where the playback of the first video content has been interrupted.

In this terminal, each of the video contents stored in the second storage area may have attribute information. The list may be composed of title information of some of the video contents stored in the second storage area, and some of the video contents may be selected from among the video contents stored in the second storage area based on the attribute information.

An example of the attribute information is time attribute information. In this manner, the video contents can be selectively displayed based on the time attribute information, and therefore a predetermined number of titles of the latest video news can be displayed.

Another example of the attribute information is classification attribute information indicating a category which the video content belongs to. In this case, since the video contents are selectively displayed based on the classification attribute information, only the news of specific fields can be selectively displayed on the client by classifying the video contents into fields such as politics, economics, cultures and sports, assigning corresponding classification attribute information to each of the video contents, and preliminarily designating specific fields for each of the clients.

The present invention also provides a computer program executed by a computer to perform a method of receiving video contents from a server system that comprises at least one server and delivers video contents via a network to clients by streaming. The server system includes a first storage area and a second storage area. The method includes: receiving from the server system delivery of a first video content stored in the first storage area to play back the received first video content (step S8); receiving from the server system delivery of a list of title information of video contents stored in the second storage area to display the list (step S11); receiving from the server system delivery of data for updating the list to display the updated list (steps S9 to S13); receiving an input designating a second video content from the updated list to deliver a request of the second video content to the server system (step A1); and playing back the second video content delivered by the server system in response to the request (step A4).

This method may further include steps of: interrupting the playback of the first video content in response to the input designating the second video content from the updated list (step A2); and restarting the playback of the first video content in response to completion of the playback of the second video content and according to a position where the playback of the first video content has been interrupted (steps A5 to A8).

In this computer program, each of the video contents stored in the second storage area may have attribute information. The list may be composed of title information of some of the video contents stored in the second storage area, and some of the video contents may be selected from among the video contents stored in the second storage area based on the attribute information.

An example of the attribute information is time attribute information. In this manner, the video contents can be selectively displayed based on the time attribute information, and therefore a predetermined number of titles of the latest video news can be displayed (step S11).

Another example of the attribute information is classification attribute information indicating a category which the video content belongs to. In this case, since the video contents are selectively displayed based on the classification attribute information, only the news of specific fields can be selectively displayed on the client by classifying the video contents into fields such as politics, economics, cultures and sports, assigning corresponding classification attribute information to each of the video contents, and preliminarily designating specific fields for each of the clients (step S11).

Further, the present invention provides a streaming delivery system having at least one server system and at least one terminal for delivering video contents to a client via a network by a streaming method. The server system includes: a first and a second storage area (content storage portion and new information storage portion); a streaming delivery control unit for delivering video contents stored in the first and second storage areas to the client via the network by the streaming method (delivery control portion); a list generation unit for generating list data of title information of some or all of video contents of a video content group stored in the second storage area and delivering the list data to the client via the network (delivery control portion); and a list update unit for generating data for updating the list and delivering the data to the client via the network (delivery control portion). The server system starts delivery of a second video content contained in the list updated by the list update unit in response to a request from the client while delivering a first video content stored in the first storage area to the client. The terminal includes: means for receiving from the server system having the first and second storage areas delivery of the first video content stored in the first storage area and playing back the first video content (screen portion 241); means for receiving from the server system delivery of a list of title information of some or all of the video contents of the video content group stored in the second storage area and displaying the list (news information display portion 242); means for receiving from the server system delivery of data for updating the list and displaying the updated list (news information display portion 242); means for receiving an input designating a second video content from the updated list and notifying the server system thereof (information input portion 230); and means for playing back the second video content delivered from the server system in response to the notification designating the second video content (screen portion 241).

According to the present invention, the client updates the displayed list every time the video content group stored in the second storage area changed. Therefore, when a new video content is added to the second storage area during delivery or playback of the first video content, the client can be notified of that fact.

This enables the user to be notified without delay when a video content requiring prompt report is generated and added to the second storage area while a video content requiring a relatively long period of time to play back is being played back by the streaming method.

Specifically, for example, a video content such as a movie requiring a relatively long period of time to play back is stored in the first recording unit. While the movie is being delivered from the server and being played back on the client, latest video news items sequentially stored in the second storage area and the list of these latest video news items is delivered from the server so that the updated list is displayed on the client. This makes it possible for the client to display the list of the latest news items while at the same time playing back the movie.

PREFERRED EMBODIMENTS OF THE INVENTION

Preferred exemplary embodiments of the present invention will be described in detail with reference to the accompanying drawings.

Figure 1:
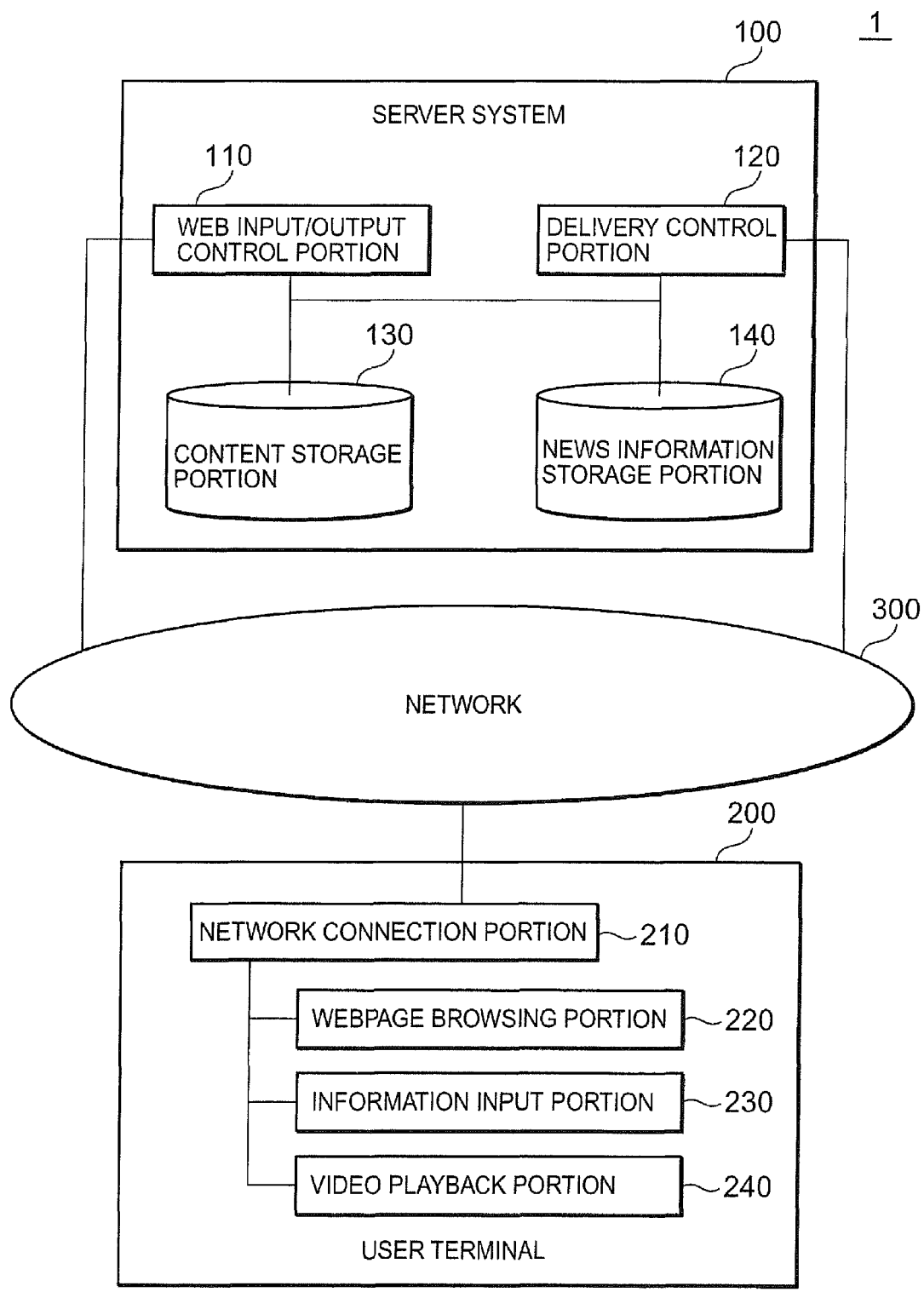
FIG. 1 is a functional block diagram of a streaming delivery system 1 according to an exemplary embodiment of the present invention.

Referring to FIG. 1, a streaming delivery system 1 according to an exemplary embodiment of the present invention is comprised of a server system 100 and a user terminal 200. The server system 100 and the user terminal 200 are connected to each other through a network 300.

The server system 100 is a computer functioning as a server, having a web input/output control portion 110, a delivery control portion 120, a content storage portion 130, and news information storage portion 140. The computer has a CPU, a main memory device, an auxiliary memory device, a network interface card, and so on. The above-mentioned portions 110, 120, 130, and 140 are realized by the CPU executing an operating system or other computer programs. While the server system 100 may be composed of a single computer, it may be embodied by a plurality of computers by dispersing the above-mentioned portions in the computers so that they operate in conjunction with each other.

The user terminal 200 is a computer which is used in common as a network client. The user terminal 200 has a CPU, a main memory device, an auxiliary memory device, a network interface card, a display device, and an input device, which are connected to each other by way of various types of buses. The user terminal 200 loads an operating system and various programs stored in the auxiliary memory device into the main memory device, and the CPU executes various processings. In particular, the CPU operates in conjunction with the network interface card, the display device, and the input device to realize a network connection portion 210, a webpage browsing portion 220, an information input portion 230, and a video playback portion 240 described below.

The portions of the server system 100 and the user terminal 200 generally operate as described below.

Upon receiving a request from the user terminal 200, the web input/output control portion 110 of the server system 100 transmits a menu screen of contents for streaming delivery to the user terminal 200. The web input/output control portion 110 also receives designation of a content to be delivered from the user terminal 200 and notifies the user terminal 200 of delivery settings.

Upon receiving the request from the user terminal 200, the delivery control portion 120 performs streaming delivery of the video content while at the same time transmits title information and performs streaming delivery of video news to the user terminal 200. The delivery control portion 120 also generates data of a list of title information of video news stored in the news information storage portion 140, and delivers the list data to the user terminal 200 via the network 300. The delivery control portion 120 also generates data for updating the title information list, and delivers the same to the user terminal 200 via the network 300. Further, while delivering the video content stored in the content storage portion 130 to the user terminal 200, the delivery control portion 120 starts delivery of video news contained in the updated list in response to a request from the user terminal 200.

The content storage portion 130 stores video contents to be stream-delivered to the user terminal 200, information associated with the video contents, and so on. The contents group stored in the content storage portion 130 is composed of contents which are basically not required to notify the user promptly after addition of a new content, particularly such as movies, documentaries, and dramas.

The news information storage portion 140 stores video news to be stream-delivered to the user terminal 200 and information associated with the video news. Addition of a new item of the video news is required to be notified to the user as soon as possible. Each of the video news items is stored together with its title information. When storing an a video news item, the news information storage portion 140 also stores attribute information indicating the time at which it is stored, namely time attribute information, in association with the video news item.

The network connection portion 210 of the user terminal 200 connects the user terminal 200 to the server system 100 via the network 300.

The webpage browsing portion 220 displays a webpage such as a menu screen of the contents for streaming delivery transmitted by the server system 100.

The information input portion 230 inputs a request to the server system 100, for example.

The video playback portion 240 plays back a video content stream-delivered by the server system 100. The video playback portion 240 also displays the title information and plays back the video news. More specifically, the video playback portion 240 displays a screen portion 241, a news information display portion 242, and an operation panel portion 24 to be described later on a display device of the user terminal 200.

The network 300 is a data communication network such as Internet.

First Exemplary Embodiment

Referring to the flowcharts of FIGS. 2 and 3, operation of the streaming delivery system 1 according to a first exemplary embodiment will be described. It is assumed that the news information storage portion 140 stores ten items of video news 1, 2, . . . , and 10 at the beginning, and the items of video news have title information of "news information 01", "news information 02", . . . , and "news information 10", respectively.

Figure 2:
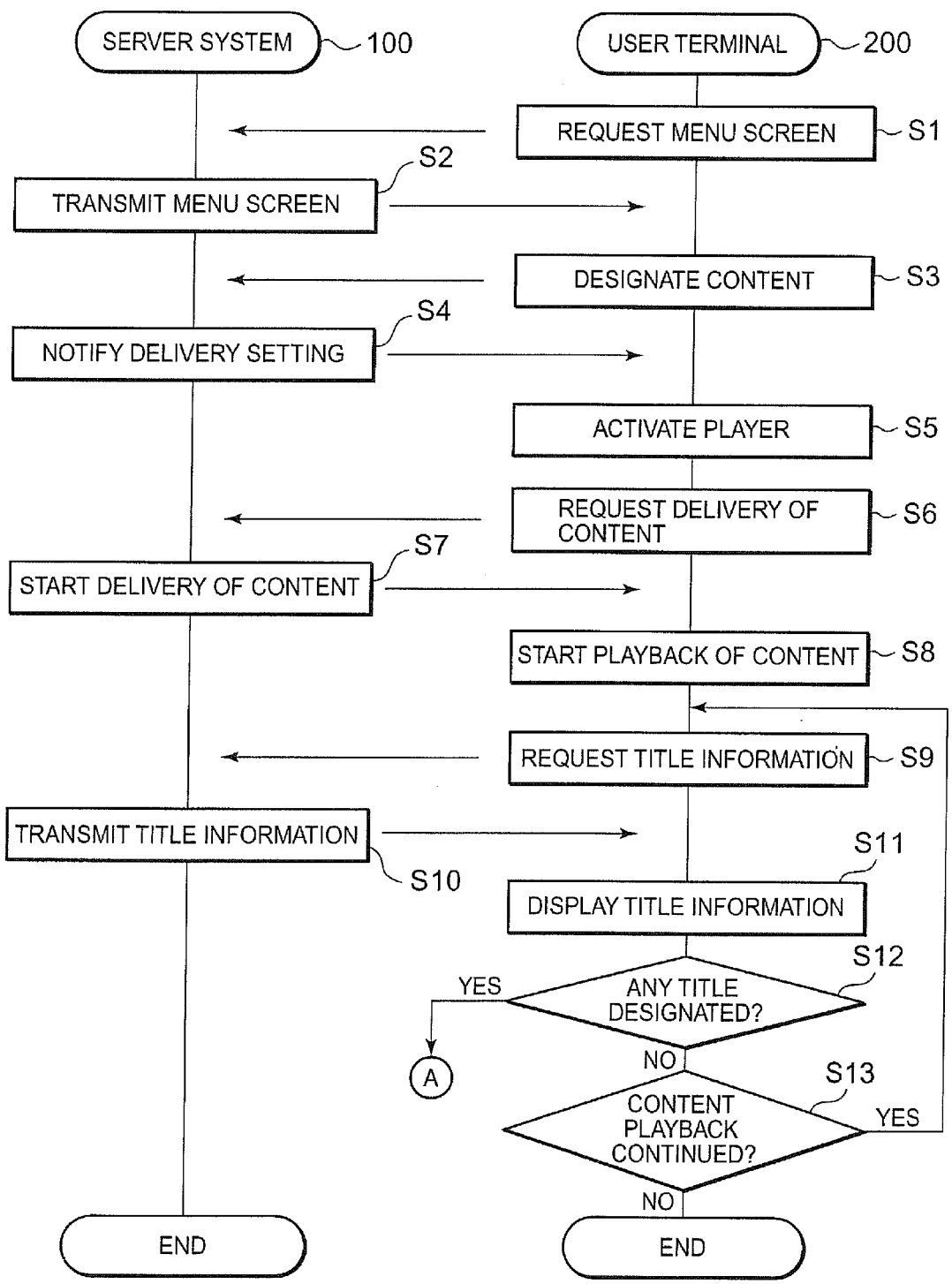
FIG. 2 is a flowchart for explaining operation of the streaming delivery system 1 according to a first exemplary embodiment.

In the first step, the web browser of the user terminal 200 requests the server system 100 for a menu screen of the contents for streaming delivery via the network 300 (step S1 of FIG. 2). Receiving the request, the server system 100 transmits a menu screen of the contents for streaming delivery to the web browser of the user terminal 200 (step S2). The user terminal 200 displays the menu screen thus received. This menu screen contains a list of video contents stored in the content storage portion 150.

The user terminal 200 then designates a video content to request for streaming delivery, and the designation is transmitted to the server system 100 (step S3). Receiving the designation, the server system 100 notifies delivery settings relating to the designated content to the user terminal 200 (step S4). The notification of the delivery settings to the user terminal 200 contains information relating to video player activation and connection to the server system 100. Receiving the notification, the user terminal 200 activates the video player preliminarily installed therein (step S5).

Further, the user terminal 200 requests the server system 100 for streaming delivery of the designated content (step S6). Receiving the request, the server system 100 starts streaming delivery of the designated content to the user terminal 200 (step S7). Receiving this, the video player of the user terminal 200 starts playing back the content (step S8).

Figure 4:
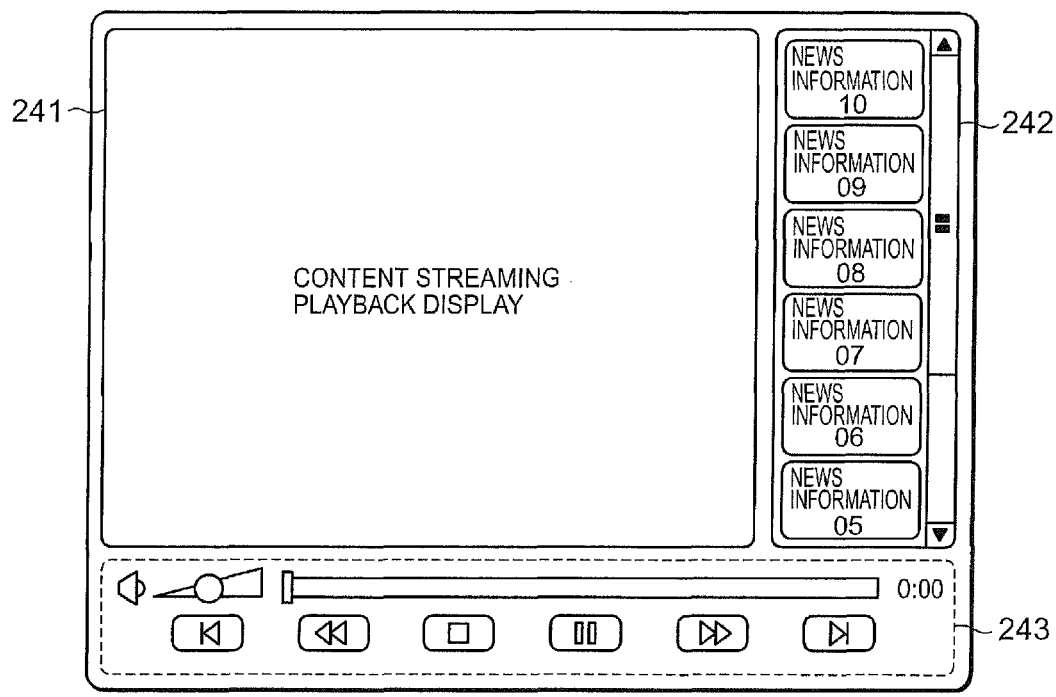
FIG. 4 is a diagram showing an example of screen configuration of a video player displayed on a display device of a user terminal 200.

Further, the user terminal 200 requests the server system 100 for title information of ten latest video news items (step S9). The number of items of title information of video news to request is preliminarily set in the video player. Although the number is set to ten herein, the number can be increased or decreased as required by changing the setting. Receiving the request, the server system 100 transmits the requested number of latest title information items to the user terminal 200, referring to the title information and time attribute information of the video news (step S10). The user terminal 200 displays the title information thus received on the video player (step S11). Here, the video player of the user terminal 200 exhibits a screen as shown in FIG. 4.

Brief description will be made of examples of screen display in general illustrated in FIGS. 4 to 8 and FIGS. 12 to 18.

A screen portion 241 is a screen area to perform streaming playback display. When a video content stored in either the content storage portion 130 or the news information storage portion 140 is delivered, the video content is played back and displayed on the screen portion 241.

A news information display portion 242 is an area to display title information of a requested number of video news items stored in the news information storage portion 140. The title information is a thumbnail image composed of a still image featuring a scene of the video news and a headline of the video news displayed thereon. In the example illustrated herein, the number of the title information items to display is set to ten. Six out of the ten title information items are displayed on the screen. The remaining title information items are to be displayed by moving a scroll bar on the right side of the news information display portion 242. The title information displayed in the news information display portion 242 is updated every predetermined time. When a new item of video news is added in the news information storage portion 140, the title display of the oldest video news item is withdrawn and the title of the new video news item is displayed instead. When any of the displayed title information items is clicked, the screen portion 241 interrupts the playback of the video contents being playback-displayed at the time, and instead playback-displays video news corresponding to the clicked title information.

An operation panel portion 243 is an area to receive the user's operation relating to the video being played back on the screen portion 241 by way of an input device such as a mouse. Substantially trapezoidal, triangle and circular marks in the upper left side of the operation panel portion 243 are for volume adjustment. A bar graph extends laterally in the upper right side of the operation panel portion 243, in which a tab moves from the left to the right according to the progress of playback of a video. The figures on the right side of the bar graph indicate an elapsed time from the start of the playback. There are operation buttons in the lower part of the operation panel portion 243, for operations to return to the playback start position, to rewind, to cancel the playback, to temporarily interrupt, to fast-forward, and to forward to the playback end position, respectively.

Returning to description of step S11, in the screen example of FIG. 4, the video player performs streaming playback display of a designated content delivered by the content storage portion 130 in the screen portion 241. The video player displays, in the news information display portion 242, the title information of the latest video news, from "news information 10" to "news information 05". The title information from "news information 04" to "news information 01" will be displayed by scroll operation. Since the screen example indicates a state directly after the start of the playback, the elapsed time is displayed as 0:00 in the operation panel portion 243. It is assumed that, at this point of time, none of the title information items displayed in the operation panel portion 243 is selected (step S12).

The user terminal 200 checks the content playback state of the video player upon elapse of a prescribed time from starting display of the title information in step S11 (step S13). If the video player has completed playback of the designated content at this point of time, the operation of the video player is terminated. If the playback of the designated content is still continuing, the operation returns to step S9, in which the user terminal 200 again requests the server system 100 for transmission of title information of ten latest video news items (step S9).

It is assumed that video news 11 has been added to the news information storage portion 140 as newly-arrived news. Title information of the video news item 11 is denoted as "news information 11". Then, it is the news information 11 that has the latest time attribute information. The server system 100 therefore transmits to the user terminal 200 title information of ten news information items from news information 02 to news information 11 as the latest title information (step S10). The user terminal 200 displays the received title information on the video player (step S11).

Figure 5:
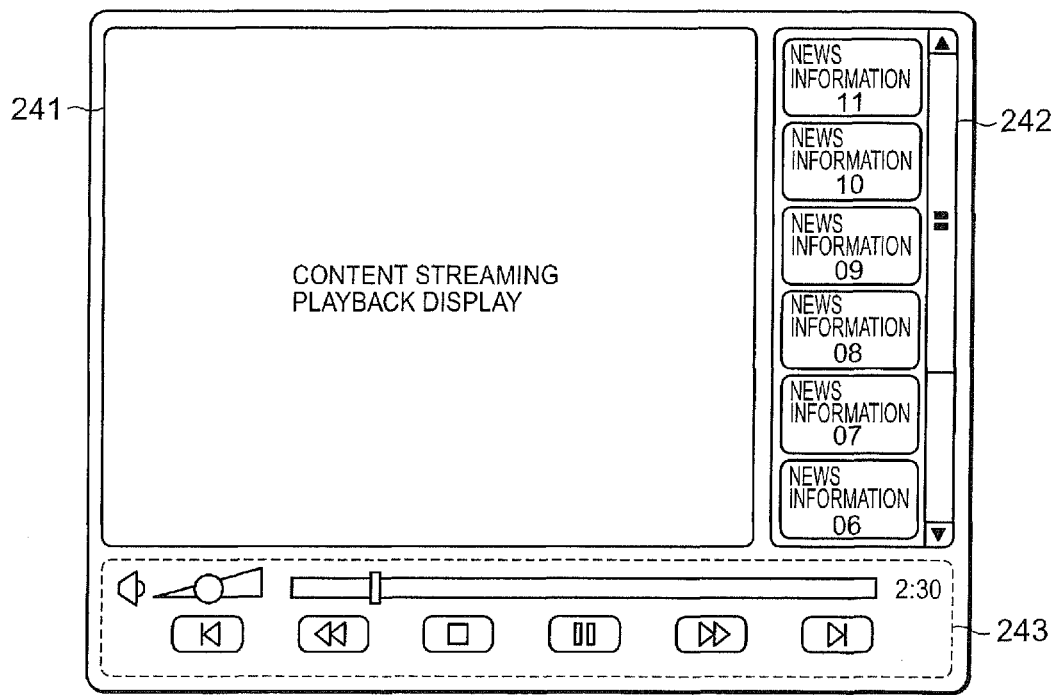
FIG. 5 is a diagram showing an example of screen configuration of the video player displayed on the display device of the user terminal 200.

Then, the screen of the video player of the user terminal 200 becomes as shown in FIG. 5. In the screen example shown in FIG. 5, the video player is still continuing the streaming playback display of the designated content in the screen portion 241. At this moment, the operation panel portion 243 indicates that the designated content is being played back at the position of two minutes thirty seconds (2:30). There are displayed, in the news information display portion 242, ten title information items corresponding to the latest video news items from video news 2 to video news 11. It is assumed here again that none of the title information from video news 2 to video news 11 has been designated by click operation of a mouse or the like (step S12).

Further, the user terminal 200 checks the content playback state of the video player upon elapse of a prescribed time from the display of the title information from video news 2 to video news 11 in step S11 (step S13). If the video player is still continuing the playback of the designated content, the operation returns to step S9, and the user terminal 200 again requests the server system 100 for transmission of title information of ten latest video news items (step S9).

It is assumed that video news 12 has been added as newly-arrived news to the news information storage portion 140. Then, the server system 100 transmits to the user terminal 200 title information of ten video news items from video news 3 to video news 12 as the latest news (step S10). The user terminal 200 displays the received title information on the video player (step S11).

Figure 6:
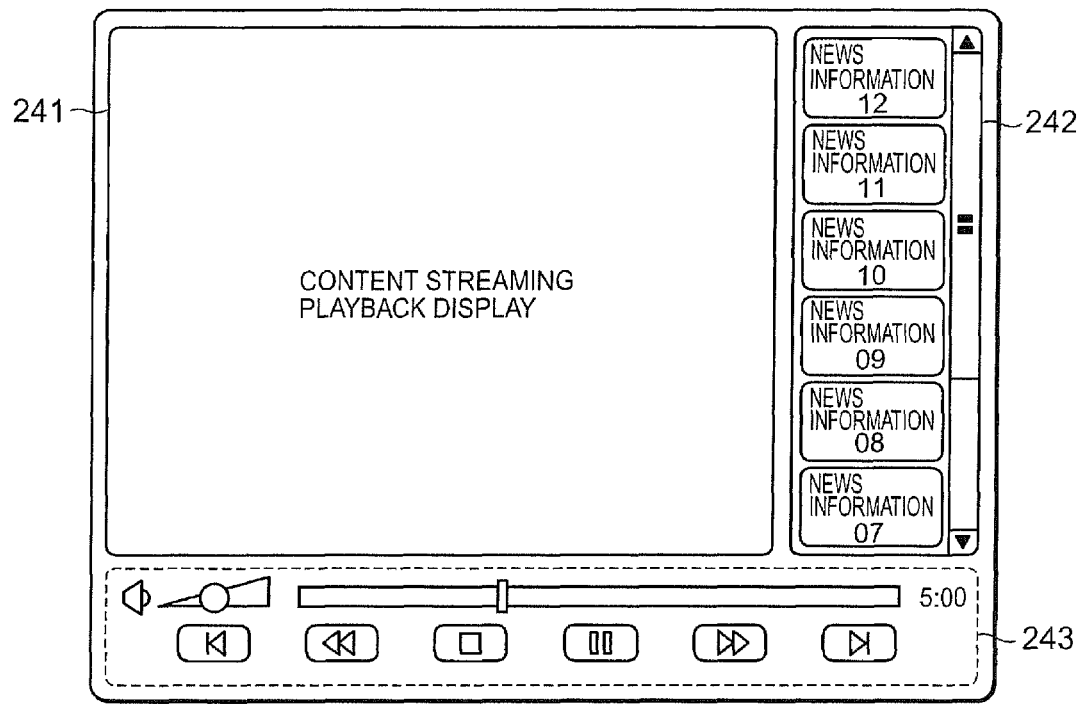
FIG. 6 is a diagram showing an example of screen configuration of the video player displayed on the display device of the user terminal 200.

The screen of the video player of the user terminal 200 becomes as shown in FIG. 6. In the screen example of FIG. 6, the video player is still continuing the streaming playback display of the designated content in the screen portion 241, while displaying the ten title information items corresponding to the latest video news from video news 3 to video news 12 in the news information display portion 242.

Figure 3:
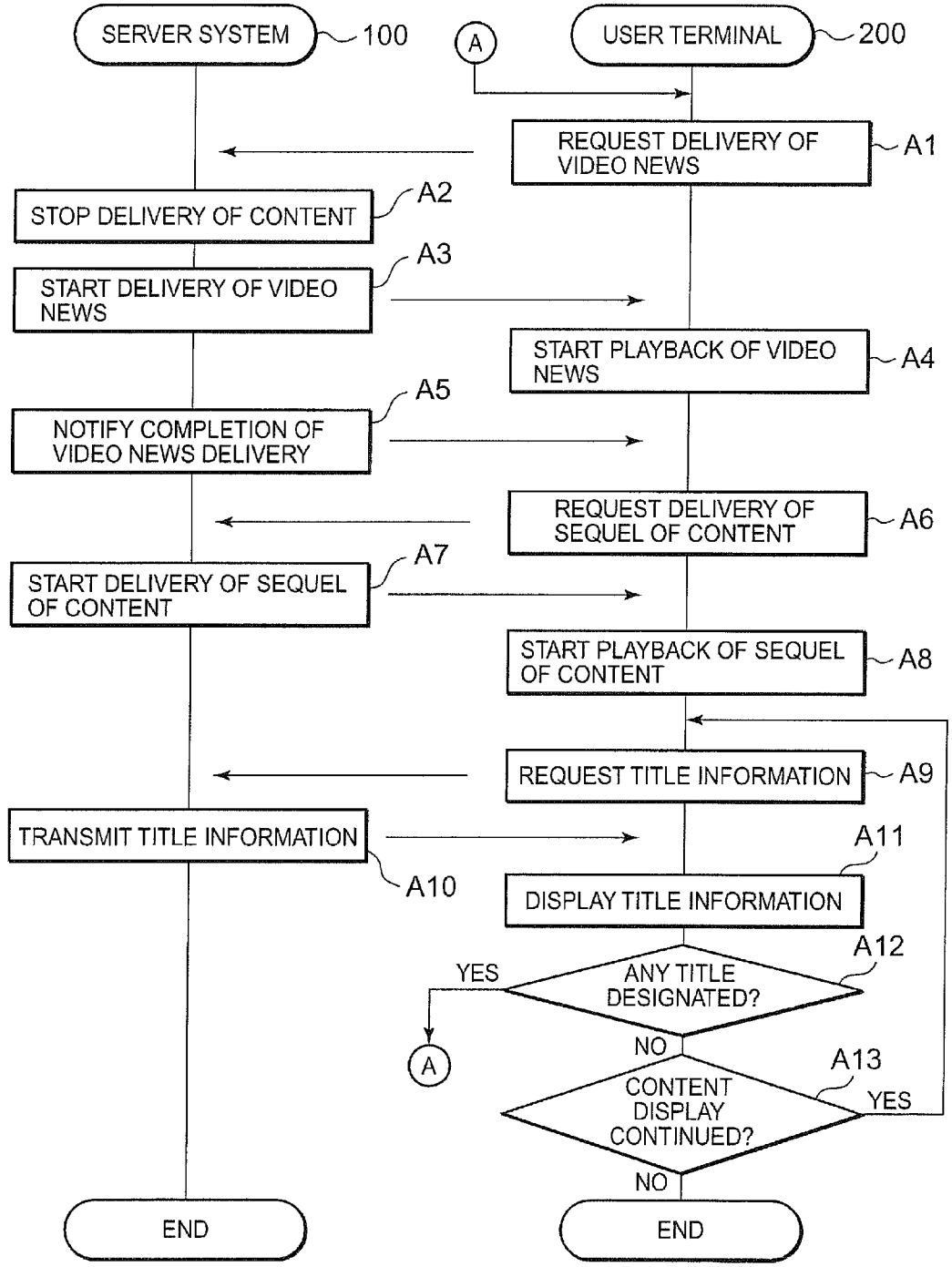
FIG. 3 is a flowchart for explaining operation of the streaming delivery system 1 according to the first exemplary embodiment.

It is assumed here that the display of the title information of "news information 12" corresponding to the video news 12 is designated by being clicked with the mouse (step S12 and step A1 in FIG. 3). The video player of the user terminal 200 then stores the time at which the playback of the content is interrupted by the click operation. Referring to the screen example of FIG. 6, the contents playback time displayed in the operation panel portion 243, namely "five minutes zero seconds (5:00) is stored. In response to the designation, the server system 100 stops the streaming delivery of the designated content to the user terminal 200 (step A2).

Figure 7:
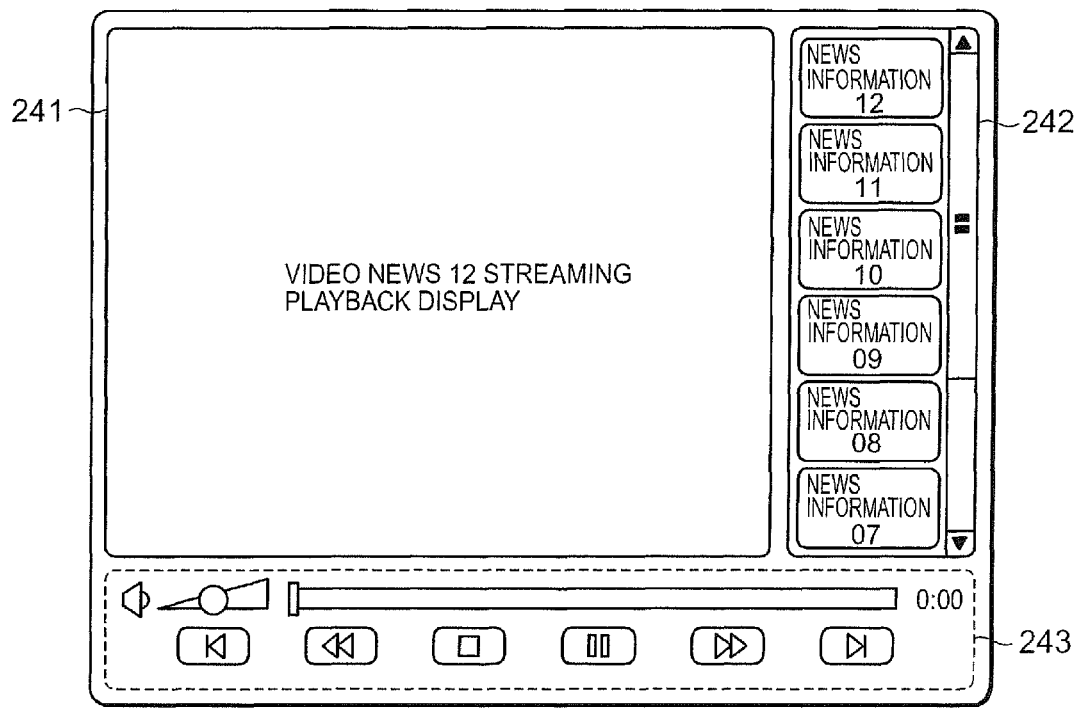
FIG. 7 is a diagram showing an example of screen configuration of the video player displayed on the display device of the user terminal 200.

The server system 100 subsequently starts streaming delivery of the video news 12 to the user terminal 200 (step A3). Receiving this, the video player of the user terminal 200 starts playing back the video news 12 (step A4). The screen of the video player of the user terminal 200 becomes as shown in FIG. 7. In the screen example shown in FIG. 7, the video player is performing streaming playback display of the video news 12 in the screen portion 241. The video player is also displaying the ten title information items of from video news 3 to video news 12 in the news information display portion 242.

Further, upon completion of the streaming delivery of the video news 12, the server system 100 notifies the user terminal 200 of the completion of delivery (step A5). Receiving the notification, the user terminal 200 refers to the data of the time at which the playback of the content has been interrupted, and requests the server system 100 for streaming delivery of the content, starting from the position at which the playback has been interrupted (step A6). Here, the user terminal 200 requests delivery of the content starting from the playback interruption time "five minutes zero seconds (5:00)" stored in step A1. Receiving the request, the server system 100 starts streaming delivery of the designated content to the user terminal 200 starting from the position of five minutes zero seconds from the top thereof (step A7). Receiving this, the video player of the user terminal 200 starts playback of the designated content starting from the interrupted position (step A8).

Further, the user terminal 200 requests the server system 100 for transmission of title information of the ten latest video news items (step A9). Receiving the request, the server system 100 refers to the title information held by the server system 100, and transmits the requested number of latest title information items to the user terminal 200 (step A10). It is assumed here that since there is no other newly-arrived news following the video news 12, the ten title information items of from video news 3 to video news 12 has been retransmitted as the latest title information. Receiving this, the user terminal 200 displays the retransmitted ten title information items of from video news 3 to video news 12 on the video player (step A1).

Figure 8:
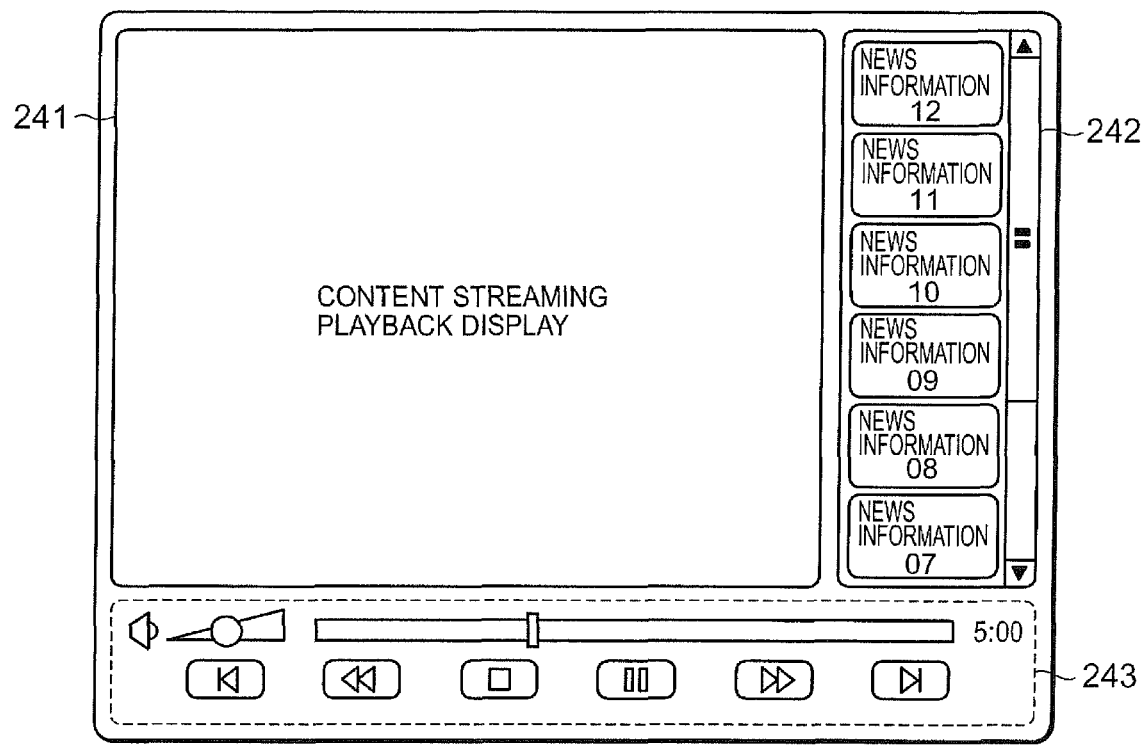
FIG. 8 is a diagram showing an example of screen configuration of the video player displayed on the display device of the user terminal 200.

The screen of the video player of the user terminal 200 becomes as shown in FIG. 8. The video player restarts streaming playback display of the designated content in the screen portion 241, starting from the interrupted position. The ten title information items of from video news 3 to video news 12 are displayed in the news information display portion 242. It is assumed here that the user of the user terminal 200 does not perform operation to designate any of the title information items displayed in the news information display portion 242 of the screen shown in FIG. 8 (step A12).

In this manner, the user terminal 200 checks the content playback state of the video player every time a prescribed time is elapsed after the title information is displayed in step A11 (step A13). If the video player is continuing playback of the designated content, the operation returns to step A9, whereas if the playback of the designated content has been completed, the user terminal 200 terminates the operation of the video player.

According to this first exemplary embodiment, when a new video news item is additionally stored in the news information storage portion 140 of the server system 100 while the user terminal 200 is playing back the content delivered from the content storage portion 130 in the screen portion 241, title information including that of the new video news item is displayed in the news information display portion 242 within a predetermined period of time. This enables the user to know substantially without delay that a new news item has become available for delivery even while the user is watching other content such as a movie.

Further, according to the first exemplary embodiment, when the playback is switched from the designated content stored in the content storage portion 130 to the video news stored in the news information storage portion 140, the playback time of the designated content is recorded, so that upon completion of the playback of the video news the recorded playback time is referred to and the sequel of the designated content is delivered and played back. This enables the user to restart watching the designated content immediately after finishing watching the video news without any special operation.

Second Exemplary Embodiment

Description will be made of a second exemplary embodiment of the present invention. In the second exemplary embodiment, the streaming delivery system 1 shown in FIG. 1 operates differently from in the first exemplary embodiment. In the first exemplary embodiment, all the video news items are treated collectively as news regardless of contents thereof. Therefore, the title information in the news information display portion 242 is updated even if the newly added news item belongs to a category which the user is not interested in. In the second exemplary embodiment, in contrast, the video news items are classified into categories according to the contents thereof, and each video news item is assigned with classification attribute information indicating its category before being stored in the news information storage portion 140. On the other hand, the user preliminarily registers in the user terminal 200 categories of news the user wants to be delivered. When requesting the server system 100 for title information, the user terminal 200 notifies the server system 100 of the registered categories, so that the server system 100 transmits only the title information of the video news belonging to the registered categories to the user terminal 200.

Referring to the flowcharts of FIGS. 9, 10 and 11, the overall operation of the second exemplary embodiment will be described in detail.

Figure 9:
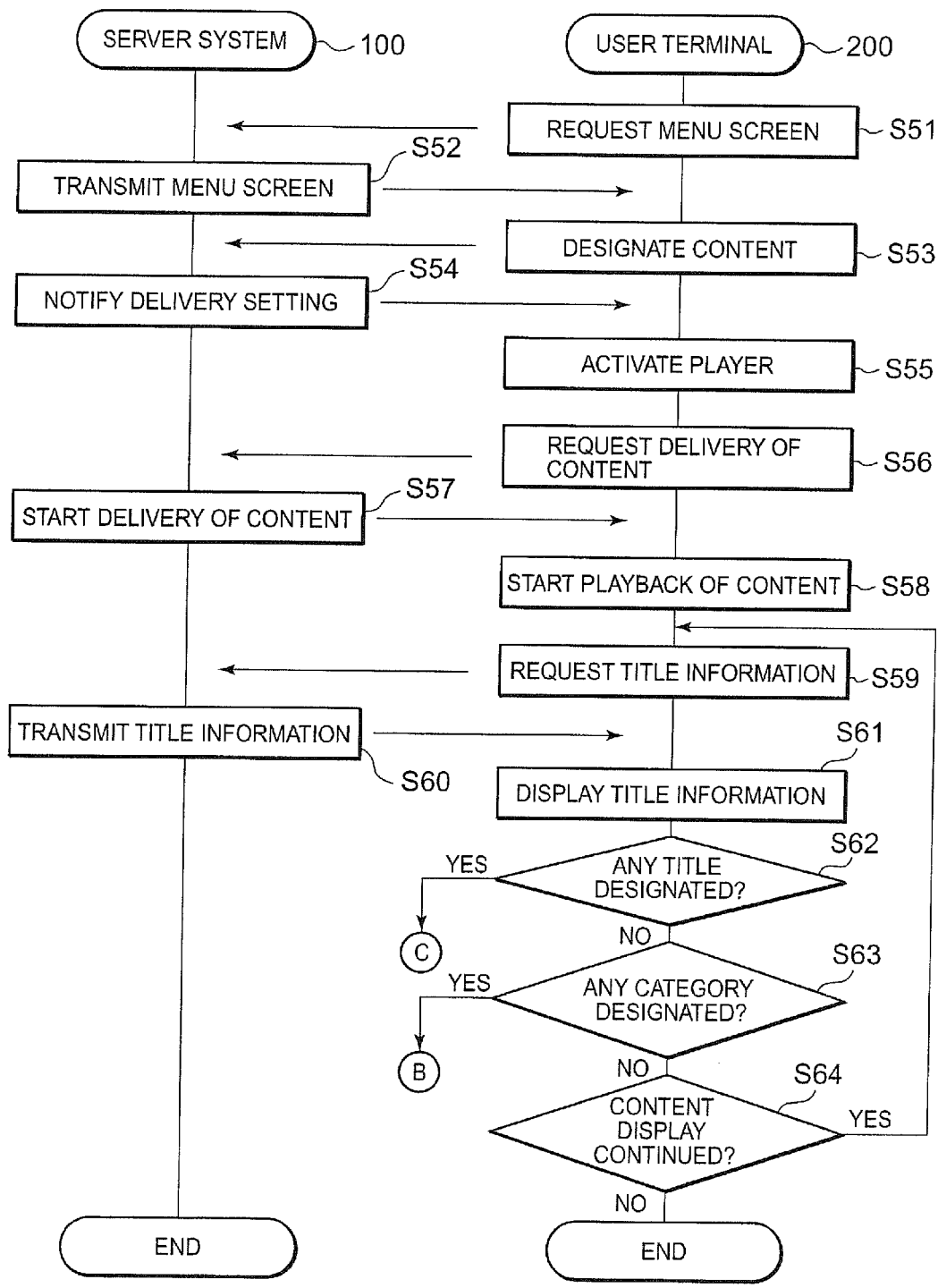
FIG. 9 is a flowchart for explaining operation of the streaming delivery system 1 according to a second exemplary embodiment.

First, the web browser of the user terminal 200 requests the server system 100 for a menu screen of contents for streaming delivery via the network 300 (step S51 in FIG. 9). Receiving the request, the server system 100 transmits the menu screen of the contents for streaming delivery to the web browser (step S52). As a result, a list of the video contents that can be watched by streaming delivery is displayed on the web browser of the user terminal 200.

Subsequently, the user terminal 200 designates a video content for which streaming delivery is requested from the list of the video contents, and the designation is transmitted to the server system 100 (step S53). Receiving the designation, the server system 100 notifies the user terminal 200 of delivery settings relating to the designated content (step S54). The notification of the delivery settings to the user terminal 200 contains information relating to activation of the video player and connection to the server system 100. Receiving this, the user terminal 200 activates the video player preliminarily installed therein (step S55).

Further, the user terminal 200 requests the server system 100 for streaming delivery of the designated content (step S56). Receiving the request, the server system 100 starts streaming delivery of the designated content to the user terminal 200 (step S57). The video player of the user terminal 200 starts playing back the content thus received (step S58).

Further, the user terminal 200 requests the server system 100 for title information of ten latest video news items (step S59). The number of title information items to request can be changed arbitrarily by changing the setting in the video player. Receiving the request, the server system 100 refers to title information and time attribute information held thereby, and transmits the requested number of title information items to the user terminal 200 (step S60). The user terminal 200 displays the received title information on the video player (step S61).

Figure 12:
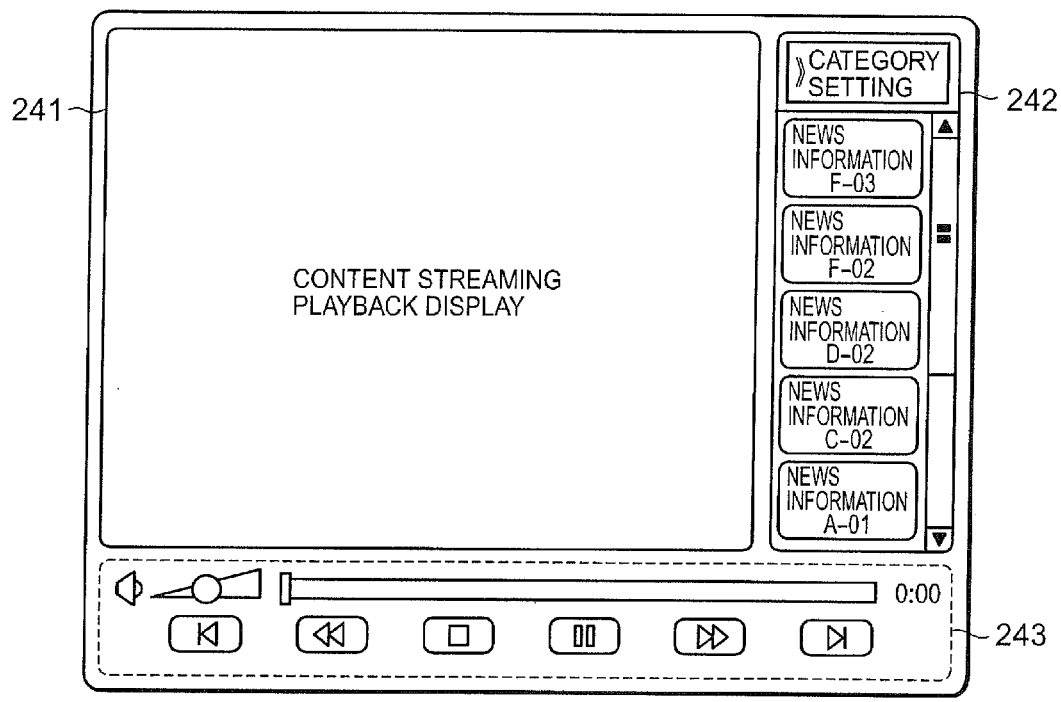
FIG. 12 is a diagram showing an example of screen configuration of a video player displayed on the display device of the user terminal 200 according to the second exemplary embodiment.

The screen of the video player of the user terminal 200 thus becomes as shown in FIG. 12. In the screen example of FIG. 12, the video player performs streaming playback display of the designated content in the screen portion 241, and displays in the news information display portion 242 a "category setting" button for setting interested categories of title information and title information of the latest video news. Further, the video player displays in the operation panel portion 243 operation buttons for volume adjustment, temporary stop and the like. There are displayed in the news information display portion 242 the ten title information items as the latest title information consisting of video news F-03, video news F-02, video news D-02, video news C-02, video news A-01, video news B-01, video news C-01, video news D-01, video news E-01, and video news F-01. If all the title information items cannot be contained within the screen of the news information display portion 242, they may be displayed by scrolling the screen by operation of the scroll bar.

The title information of the video news displayed in the news information display portion 242 indicates information relating to video news items that can be played back and displayed in the screen portion 241 while interrupting the streaming playback display of the designated content. Herein, for the sake of convenience, the title information items are classified into six categories of category A, category B, category C, category D, category E, and category F, and are assigned with serial numbers for each of the categories. For example, the video news A-01 belongs to the category A, while the video news C-01 and video news C-02 belong to the category C. The category classification of the title information such as the category A and category B may be based on typical categories such as politics, economy, society, entertainment, and sports.

It is assumed here that none of these title information items of video news has been designated by click operation of a mouse or the like (step S62). It is also assumed here that the "category setting" button displayed in the news information display portion 242 has not been clicked with the mouse to set the interested categories of the title information (step S63).

Further, the user terminal 200 checks the content playback state of the video player upon elapse of a prescribed time after starting the display of the title information in step S61 (step S64). If the video player has completed the playback of the designated content, the operation of the video player is terminated. If the video player is still continuing the playback of the designated content, the operation returns to step S59, and the user terminal 200 again requests the server system 100 of transmission of title information of ten latest video news items (step S59).

Receiving the request, the server system 100 refers to the title information held thereby and transmits the requested title information to the user terminal 200 (step S60). It is assumed here that since no newly-arrived news has been added following the video news F-03, the ten title information items transmitted as the latest title information are video news F-03, video news F-02, video news D-02, video news C-02, video news A-01, video news B-01, video news C-01, video news D-01, video news E-01, and video news F-01.

Figure 13:
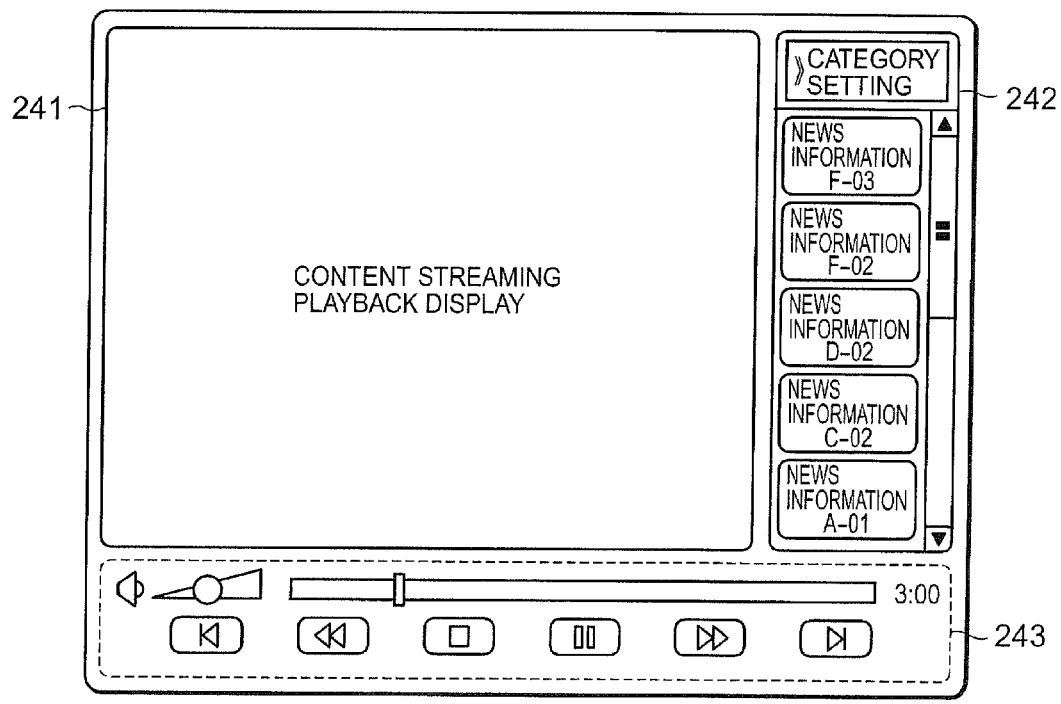
FIG. 13 is a diagram showing an example of screen configuration of the video player displayed on the display device of the user terminal 200 according to the second exemplary embodiment.

The user terminal 200 displays the retransmitted title information items of the video news on the video player (step S61). The screen of the video player of the user terminal 200 thus becomes as shown in FIG. 13. In the screen example of FIG. 13, like the screen example of FIG. 12, the video player is continuing the streaming playback display of the designated content in the screen portion 241, while displaying in the news information display portion 242 the ten title information items of video news F-03, video news F-02, video news D-02, video news C-02, video news A-01, video news B-01, video news C-01, video news D-01, video news E-01, and video news F-01. It is also assumed here that none of these title information items of video news has been designated by click operation of a mouse or the like (step S62).

It is assumed here that, in the screen example of FIG. 13, the "category setting" button displayed in the uppermost part of the news information display portion 242 of the video player is designated by click operation a mouse (step S63).

Figure 14:
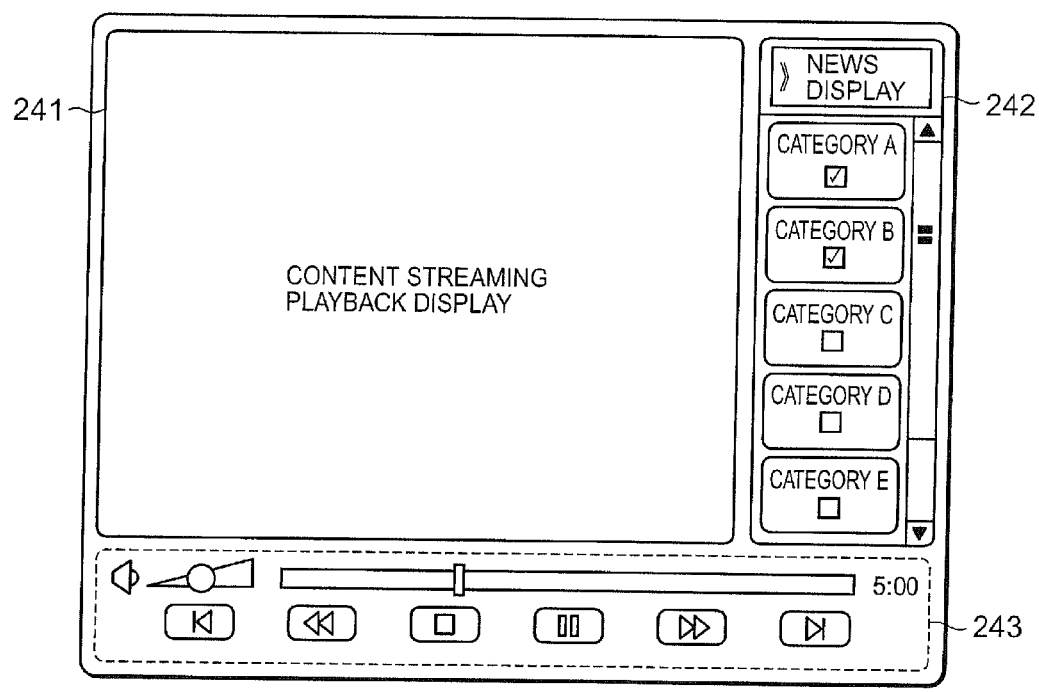
FIG. 14 is a diagram showing an example of screen configuration of the video player displayed on the display device of the user terminal 200 according to the second exemplary embodiment.

Then, the video player of the user terminal 200 displays candidates of the interested categories of title information to be selected in the news information display portion 242. The screen of the video player of the user terminal 200 becomes as shown in FIG. 14. In the screen example shown in FIG. 14, the video player continues the streaming playback display of the designated content in the screen portion 241, while displaying, in the news information display portion 242, a "news display" button for establishing the setting of the interested categories to display the title information items, and six check boxes for enabling the user to select from the six categories of category A, category B, category C, category D, category E, and category F. If all the check boxes cannot be contained within the screen of the news information display portion 242, they may be displayed by scrolling the screen by operating the scroll bar.

Figure 10:
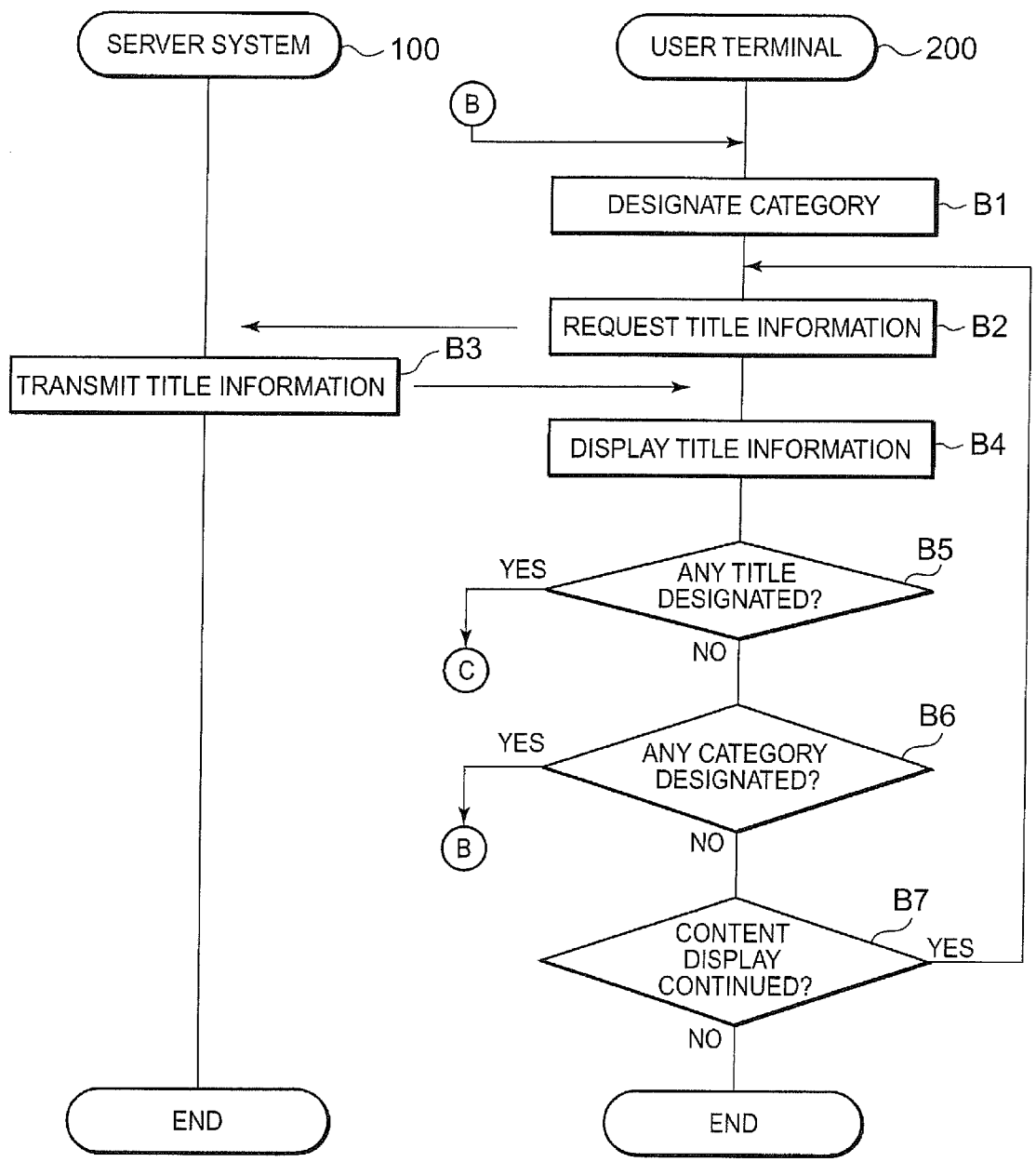
FIG. 10 s a flowchart for explaining operation of the streaming delivery system 1 according to the second exemplary embodiment.

It is assumed here that in the screen example of FIG. 14, the "news display" button is designated by mouse click in a state in which the check boxes of category A and category B displayed in the news information display portion 242 of the video player are checked for selecting as the interested categories of title information (step B1 in FIG. 10). The user terminal 200 thus requests the server system 100 for transmission of the title information of the ten latest video news items belonging to at least one of the designated categories A and B (step B2).

Receiving the request, the server system 100 refers to the classification attribute information and time attribute information of the video news items stored in the news information storage portion 140 to search for ten video news items having the latest time attribute information from among the video news items having at least either the classification attribute information of the category A or that of the category B, and transmits the title information of the video news items found by the search to the user terminal 200 (step B3). The user terminal 200 displays the received title information on the video player (step B4).

Figure 15:
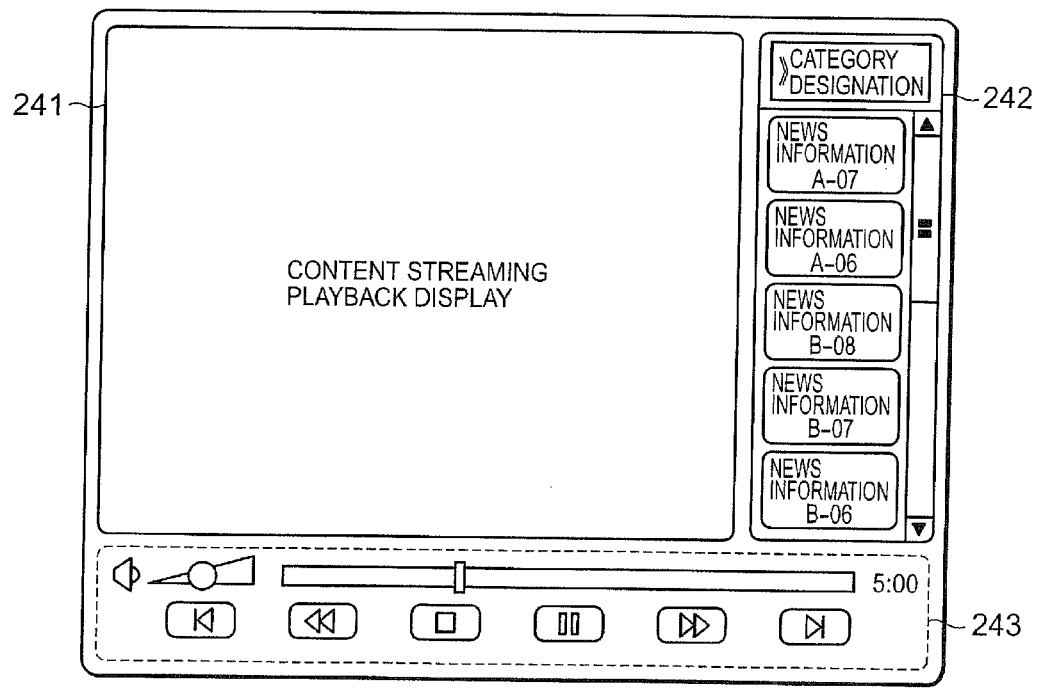
FIG. 15 is a diagram showing an example of screen configuration of the video player displayed on the display device of the user terminal 200 according to the second exemplary embodiment.

The screen of the video player of the user terminal 200 becomes as shown in FIG. 15. In the screen example shown in FIG. 15, the video player continues the streaming playback display of the designated content in the screen portion 241, while displaying in the news information display portion 242 the ten title information items of the latest video news among those belonging to the category A or B, namely video news A-07, video news A-06, video news B-08, video news B-07, video news B-06, video news B-05, video news B-04, video news A-05, video news A-04, and video news A-03. If all the title information items cannot be contained within the screen of the news information display portion 242, they may be displayed by scrolling the screen through operation of the scroll bar.

It is assumed here that none of the title information items of the video news has been designated by mouse click or the like (step B5). Although the operation returns to step B1 if the "category setting" button displayed in the news information display portion 242 is clicked though mouse operation or the like, it is assumed here that the "category setting" button has not been designated to reset the interested categories of title information (step B6).

Further, the user terminal 200 checks the content playback state of the video player upon elapse of a prescribed time from starting the display of the title information in step B4 (step B7). If the video player has completed the playback of the designated content, the operation of the video player is terminated, whereas if the video player is still playing back the designated content, the operation returns to step B2, in which the user terminal 200 again requests the server system 100 for transmission of title information of the ten latest video news items among those belonging to at least one of the designated categories A and B (step B2).

Receiving the request, the server system 100 refers to the classification attribute information and time attribute information of video news stored in the news information storage portion 140 to search for ten video news items having the latest time attribute information from among the video news having at least either the classification attribute information of category A or the classification attribute information of category B, and transmits the title information of the video news items found by the search to the user terminal 200 (step B3). It is assumed here that a video news A-08 has been added to the news information storage portion 140 after the previous execution of step B3. Therefore, the ten latest title information items transmitted this time are video news A-08, video news A-07, video news A-06, video news B-08, video news B-07, video news B-06, video news B-05, video news B-04, video news A-05, and video news A-04. The user terminal 200 displays the retransmitted title information of the video news on the video player (step B4).

Figure 16:
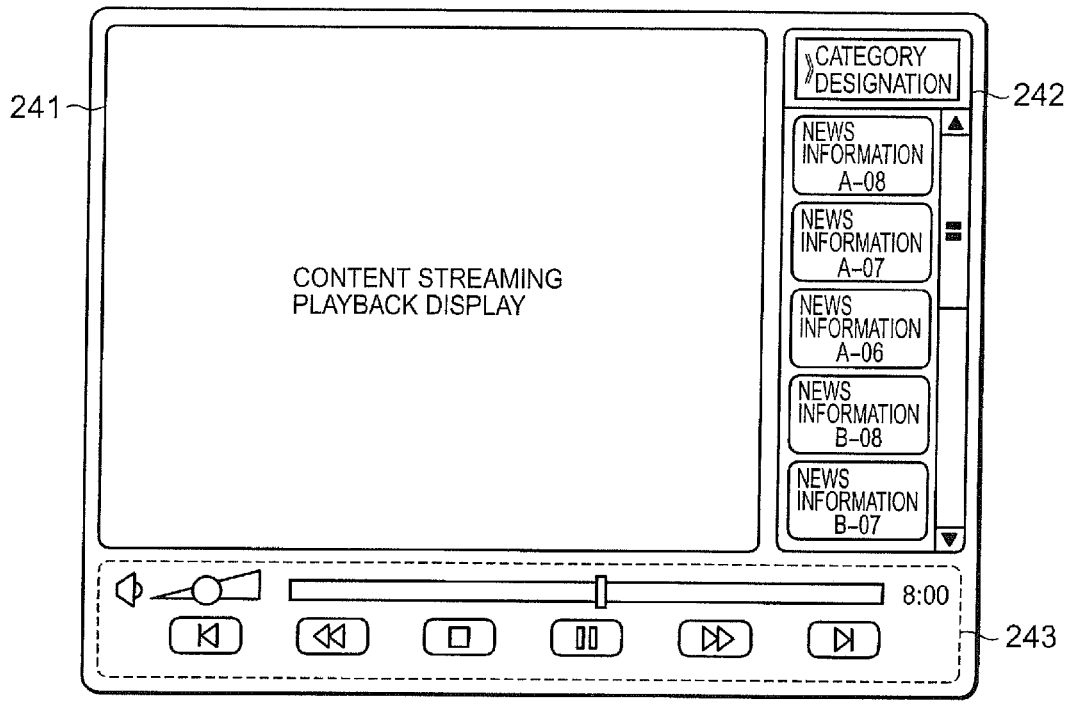
FIG. 16 is a diagram showing an example of screen configuration of the video player displayed on the display device of the user terminal 200 according to the second exemplary embodiment.

The screen of the video player of the user terminal 200 becomes as shown in FIG. 16. In the screen example of FIG. 16, the video player is continuing the streaming playback display of the designated content in the screen portion 241, while displaying in the news information display portion 242 the ten title information items of the latest video news items among those belonging to the category A or B, namely the video news A-08, video news A-07, video news A-06, video news B-08, video news B-07, video news B-06, video news B-05, video news B-04, video news A-05, and video news A-04.

Figure 11:
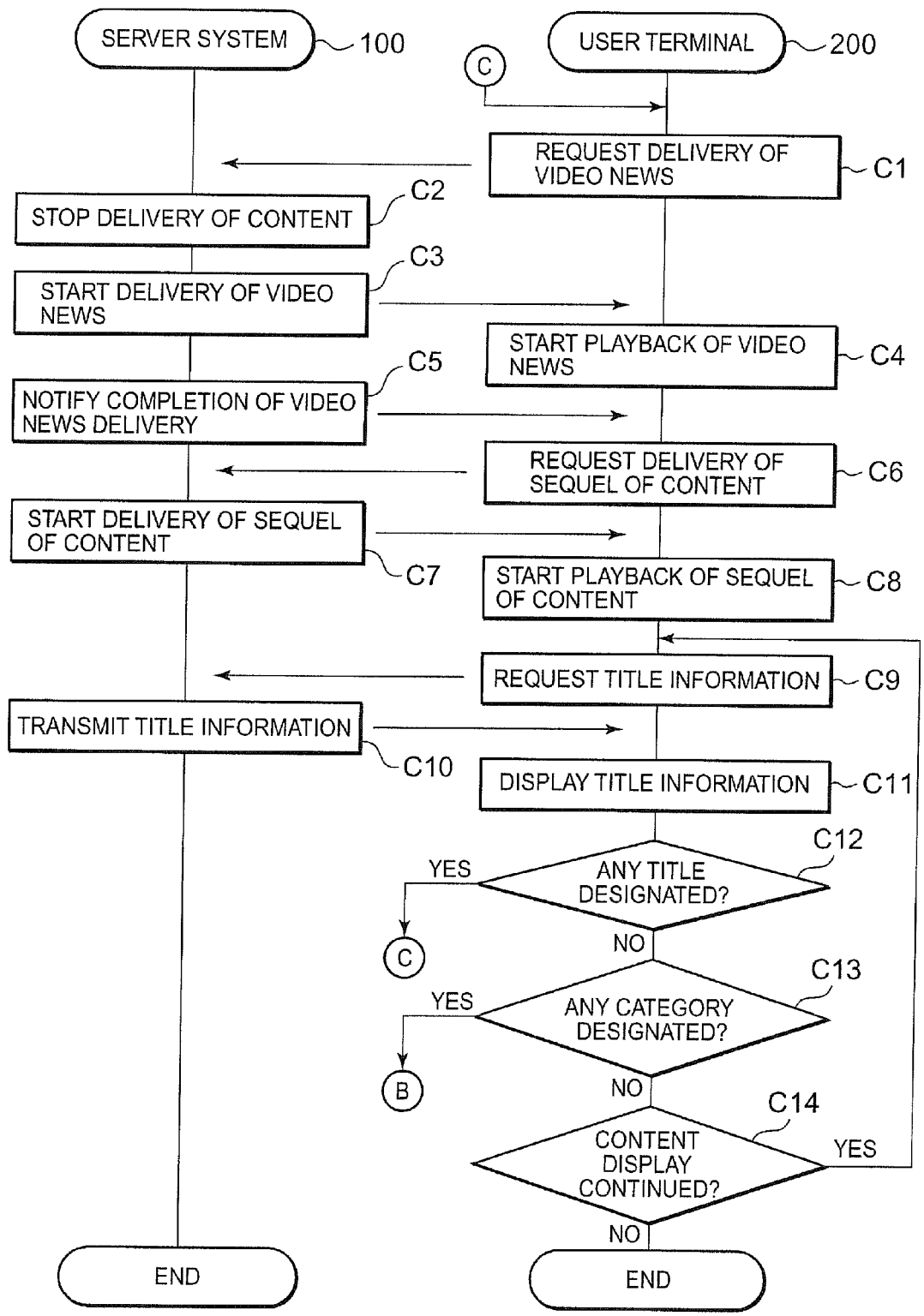
FIG. 11 is a flowchart for explaining operation of the streaming delivery system 1 according to the second exemplary embodiment.

It is assumed here that the displayed title information of the video news A-08 is designated by mouse click (step B5 and step C1 in FIG. 11). The video player of the user terminal 200 then stores the time at which the displayed title information of the video news A-08 is designated by being clicked as the content playback interruption. Referring to the screen example of FIG. 16, the content playback interruption time is defined by the content playback time of eight minutes zero seconds (8:00) displayed in the operation panel portion 243 of the video player. Receiving the designation, the server system 100 stops the streaming delivery of the designated content to the user terminal 200 (step C2).

Figure 17:
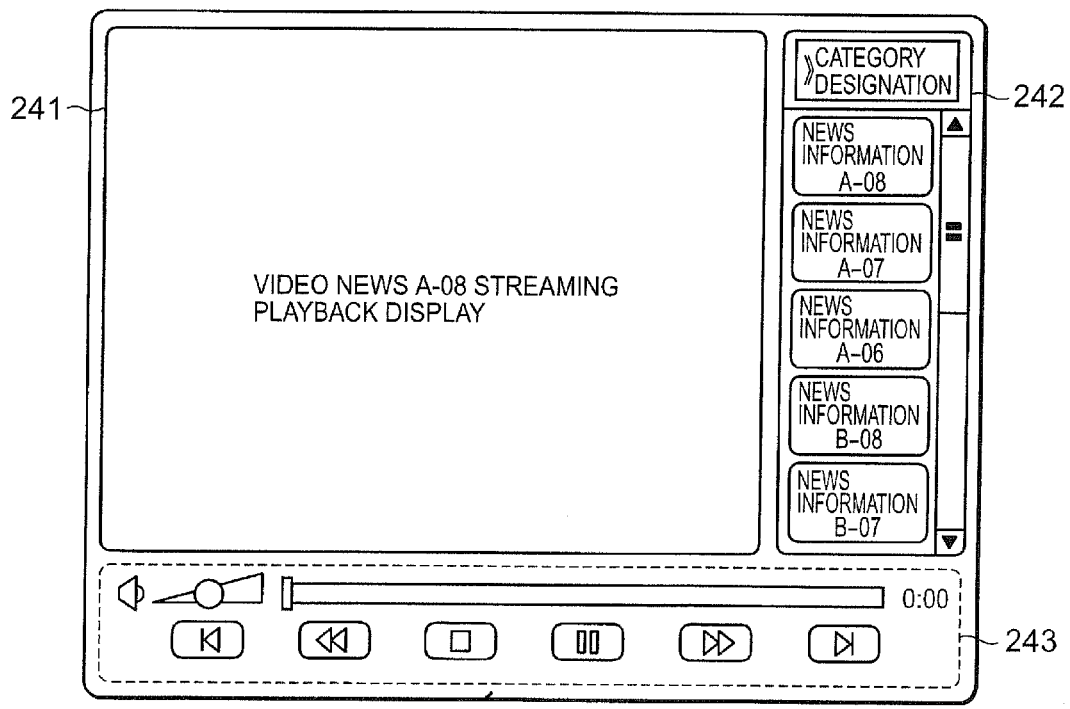
FIG. 17 is a diagram showing an example of screen configuration of the video player displayed on the display device of the user terminal 200 according to the second exemplary embodiment.

Subsequently, the server system 100 starts streaming delivery of the video news A-08 to the user terminal 200 (step C3). Receiving this, the video player of the user terminal 200 starts playing back the video news A-08 (step C4). The screen of the video player of the user terminal 200 becomes as shown in FIG. 17. In the screen example shown in FIG. 17, the video player performs the streaming playback display of the video news A-08 in the screen portion 241, while displaying in the news information display portion 242 the ten title information items consisting of video news A-08, video news A-07, video news A-06, video news B-08, video news B-07, video news B-06, video news B-05, video news B-04, video news A-05, and video news A-04.

Further, upon completion of the streaming delivery of the video news A-08, the server system 100 notifies the user terminal 200 of the completion of delivery (step C5). Receiving the notification, the user terminal 200 notifies the server system 100 of the content playback interruption time of the interrupted content, and request streaming delivery of the content starting from the interrupted position thereof (step C6). The streaming delivery of the content requested here by the user terminal 200 is started, according to the recorded data of the content playback interruption time, from the position of eight minutes zero seconds from the top of the content at which the displayed title information of the video news A-08 is designated by being clicked in step C51.

The server system 100 then starts streaming delivery to the user terminal 200 of the designated content starting from the position of eight minutes zero seconds from the top thereof (step C7). Receiving this, the video player of the user terminal 200 starts playing back the designated content starting from the interrupted position thereof (step C8).

Further, the user terminal 200 requests the server system 100 for transmission of title information of the ten latest video news items from among those belonging to at least one of the designated categories A and B (step C9). Receiving the request, the server system 100 searches the title information held thereby and transmits the requested title information to the user terminal 200 (step C10). It is assumed here that since no newly-arrived news has been added following the video news A-08, the ten title information items of video news A-08, video news A-07, video news A-06, video news B-08, video news B-07, video news B-06, video news B-05, video news B-04, video news A-05, and video news A-04 are transmitted as the latest news information.

Figure 18:
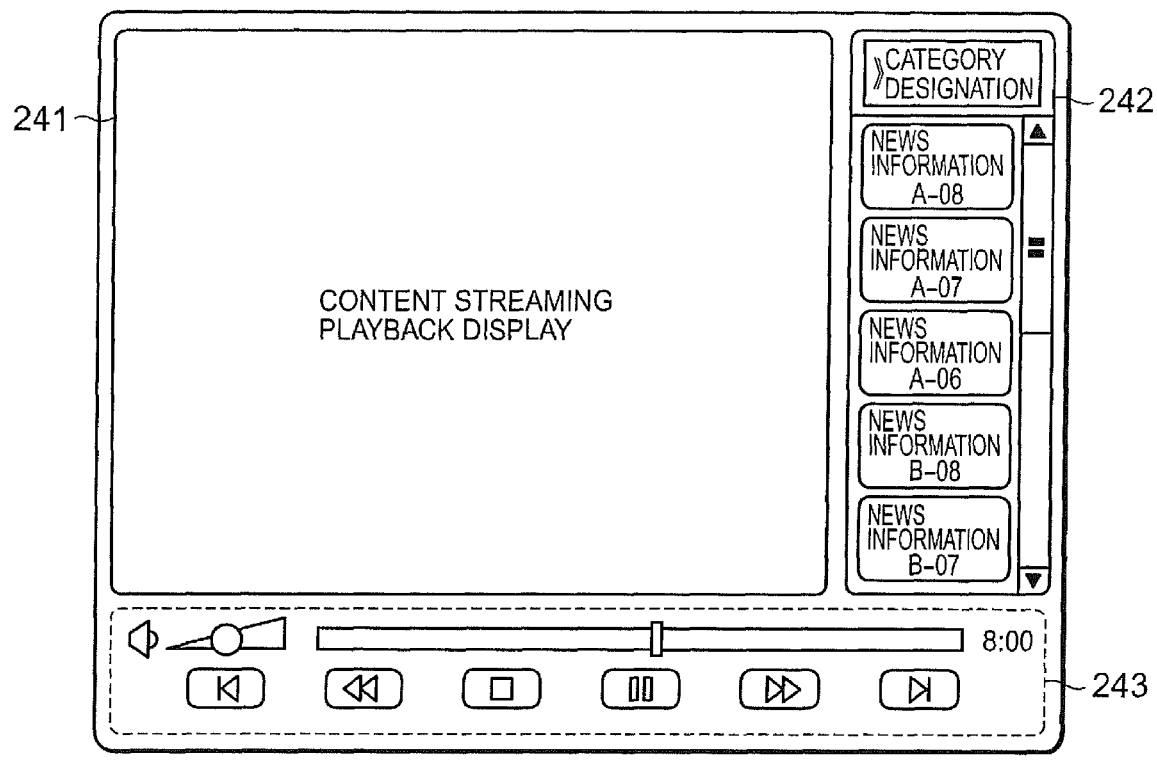
FIG. 18 is a diagram showing an example of screen configuration of the video player displayed on the display device of the user terminal 200 according to the second exemplary embodiment.

The user terminal 200 then displays the retransmitted title information of the video news on the video player (step C11). The screen of the video player of the user terminal 200 becomes as shown in FIG. 18. The screen example of FIG. 18 is similar to that of FIG. 16 corresponding to the screen example of the video player at the time when the title information of the video news A-08 is designated by being clicked in step C1. Specifically, the video player is performing the streaming playback display of the sequel of the designated content from the interrupted position in the screen portion 241, while displaying in the news information display portion 242 the ten title information items of video news A-08, video news A-07, video news A-06, video news B-08, video news B-07, video news B-06, video news B-05, video news B-04, video news A-05, and video news A-04.

Although if any of the title information items is designated by mouse click or the like, the operation returns to step C1 after storing the content playback interruption time at which the title information is designated, it is assumed here that none of the title information items of the video news has not been designated by mouse click or the like (step C12). Further, although if the "category setting" button displayed in the news information display portion 242 is designated by mouse click or the like, the operation returns to step B1 of FIG. 10, it is assumed here that the "category setting" button has not been designated to set interested categories of the title information (step C13).

Finally, the user terminal 200 checks the content playback state of the video player upon elapse of a prescribed time from the display of the title information in step C11 (step C14). If the video player is still continuing the playback of the designated content, the operation returns to step C9, whereas if the video player has completed the playback of the designated content, the operation of the video player is terminated.

According to the second exemplary embodiment, the user is allowed to arbitrarily select and set on the video player the interested categories of the video news to be displayed while the video player of the user terminal is playing back the content, and the video news belonging to the selected categories can be delivered at an arbitrary timing according to the designation by the user. This enables the user to timely watch a video news item belonging to the user's interested category even while the user is watching a stream-delivered content.

The present invention is applicable to various applications such as a streaming delivery service in which a wide variety of video contents is delivered on demand by way of Internet. The present invention is also applicable to a streaming delivery service integrating various information delivery services using Internet.

Although the present invention has been shown and described, particularly, with reference to the exemplary embodiments, the present invention is not limited to those exemplary embodiments. It should be understood by those skilled in the art that various changes in the form and details may be made therein without departing from the spirit and scope of the present invention defined by the appended claims.

What is claimed is:

1. A method of delivering video contents to a client from a server system comprising one or a plurality of servers via a network by streaming, wherein the server system comprises a first storage area and a second storage area, and the method comprises the steps of:

delivering to the client a first video content stored in the first storage area from the server system to start playback thereof on the client;

delivering to the client a list of title information of at least one of additional video contents stored in the second storage area from the server system to display the list on the client, the additional video contents being separate from the first video contents stored in the first storage area, and the title information of the additional video contents not being a part of or a transformation of the additional video contents;

storing one or a plurality of the additional video contents stored in the second storage area;

delivering data for updating the list from the server system to display the updated list on the client, where the updating is responsive to the additional video contents having been stored in the second storage area, such that a user who is watching the video contents is notified that the one or the plurality of the additional video contents have been stored in the second storage area;

receiving at the client an input of a designation to designate one of the video contents in the updated list as a second video content;

transmitting the designation from the client to the server system; and delivering the second video content from the server system to the client in response to the designation to play back the second video content on the client, wherein:

each of the video contents stored in the second storage area is related with attribute information;

the video contents in the list are selected from among the video contents stored in the second storage area based on the attribute information; and, the attribute information comprises time attribute information; and the selection is made based on the time attribute information.

2. The method according to claim 1, wherein:

the playback of the first video content on the client is interrupted in response to the input; and the playback of the first video content is restarted on the client in response to completion of the playback of the second video content on the client and according to a position where the interruption has occurred in the first video content.

3. The method according to claim 1, wherein:

the attribute information comprises classification attribute information indicating a category that the video content belongs to; and the selection is made based on the classification attribute information.

4. A server system for delivering video contents to a client via a network by streaming, comprising:
a first and a second storage area;
a streaming delivery controller that delivers video contents stored in the first storage area to the client via the network by streaming and that stores additional video contents in the second storage area;
a list generator that generates a list of title information of at least one of the additional video contents that have been stored in the second storage area, the additional video contents being separate from the video contents stored in the first storage area, and the title information of the additional video contents not being a part of or a transformation of the additional video contents;
a list transmitter that delivers the list to the client via the network; and
a list update unit for generating data for updating the list and delivering the same to the client via the network, where the updating is responsive to the at least one of the additional video contents having been stored in the second storage area, such that a user who is watching the video contents is notified that the at least one of the additional video contents have been stored in the second storage area,
wherein while a first video content stored in the first storage area is delivered to the client, delivery of a second video content contained in the list updated by the list update unit is started in response to a request that is sent from the client to designate the second video content, and wherein:
each of the video contents stored in the second storage area is related with attribute information;
the video contents in the list are selected from among the video contents stored in the second storage area based on the attribute information; and,
the attribute information comprises time attribute information; and the selection is made based on the time attribute information.

5. The server system according to claim 4, wherein:
the delivery of the first video content to the client is interrupted in response to the request; and
the delivery of the first video content is restarted in response to completion of the playback of the second video content at the client and according to the position at which the playback of the first video content is interrupted.

6. The server system according to claim 4, wherein:
the attribute information comprises classification attribute information indicating a category that the video content belongs to; and
the selection is made based on the classification attribute information.

7. A server system for delivering video contents to a client via a network by streaming, comprising:
first and a second storing means;
means for controlling streaming delivery to deliver video contents stored in the first storage area to the client via the network by streaming and that stores additional video contents in the second storage area;
means for generating a list of title information of at least one of the additional video contents that have been stored in the second storage area, the additional video contents being separate from the video contents stored in the first storage area, and the title information of the additional video contents not being a part of or a transformation of the additional video contents;
means for delivering the list to the client via the network; and
means for generating data for updating the list and delivering the same to the client via the network, where the updating is responsive to the at least one of the additional video contents having been stored in the second storage area, such that a user who is watching the video contents is notified that the at least one of the additional video contents have been stored in the second storage area,
wherein while a first video content stored in the first storage area is delivered to the client, delivery of a second video content contained in the list updated by the list update unit is started in response to a request that is sent from the client to designate the second video content, and wherein:
each of the video contents stored in the second storage area is related with attribute information;
the video contents in the list are selected from among the video contents stored in the second storage area based on the attribute information; and,
the attribute information comprises time attribute information; and the selection is made based on the time attribute information.

8. A non-transitory computer-readable data storage medium storing a computer program executed by a computer to perform a method of
delivering a video content to a client via a network, the method comprising the steps of:
delivering to a client a first video content stored in a first storage area accessible to the computer;
storing additional video contents in a second storage area accessible to the computer;
delivering to the client a list of title information of at least one of the additional video contents that have been stored in the second storage area to display the list on the client, the additional video contents being separate from the first video content stored in the first storage area, and the title information of the additional video contents not being a part of or a transformation of the additional video contents;
delivering to the client data for updating the list in accordance with the additional video contents stored in the second storage area, such that the updating is responsive to the additional video contents having been stored in the second storage area, and such that a user who is watching the video contents is notified that the additional video contents have been stored in the second storage area;
receiving from the client a request that designates one of the second video contents in the updated list; and
delivering to the client the second video content in response to the request, wherein:
each of the video contents stored in the second storage area is related with attribute information;
the video contents in the list are selected from among the video contents stored in the second storage area based on the attribute information; and,
the attribute information comprises time attribute information; and the selection is made based on the time attribute information.

9. The non-transitory-computer readable data storage medium according to claim 8, the method further comprising the steps of:
interrupting the delivery of the first video content in response to the request; and restarting the delivery of the first video content to the client in response to completion of the playback of the second video content at the client and according to a position where the playback of the first video content is interrupted.

10. The non-transitory-computer readable data storage medium according to claim 8, wherein:
the attribute information comprises classification attribute information indicating a category that the video content belongs to; and
the selection is made based on the classification attribute information.

11. A terminal receiving delivery of video contents from a server system comprising at least one server via a network by streaming, the terminal comprising:
a receiver that receives from the server system comprising a first and a second storage area delivery of a first video content stored in the first storage area to play back the first video content;
a receiver that receives from the server system delivery of a list of title information of at least one additional video content stored in the second storage area to display the list, the additional video contents being separate from the first video content stored in the first storage area, and the title information of the additional video contents not being a part of or a transformation of the additional video contents;
a receiver that receives from the server system delivery of data for updating the list to display the updated list, where the updating is responsive to the at least one of the additional video contents having been stored in the second storage area, such that a user who is watching the video contents is notified that the at least one of the video contents have been stored in the second storage area;
an input device that receives an input designating a second video content from the updated list to deliver a request of the second video content to the server system; and
a player that plays back the second video content delivered from the server system in response to the request, wherein:
each of the video contents stored in the second storage area is related with attribute information;
the video contents in the list are selected from among the video contents stored in the second storage area based on the attribute information; and,
the attribute information comprises time attribute information; and the selection is made based on the time attribute information.

12. The terminal according to claim 11, wherein:
the playback of the first video content is interrupted in response to the input; and
the playback of the first video content is restarted in response to completion of the playback of the second video content and according to a position where the playback of the first video content has been interrupted.

13. The terminal according to claim 11, wherein:
the attribute information comprises classification attribute information indicating a category that the video content belongs to; and
the selection is made based on the classification attribute information.

14. A terminal receiving delivery of video contents from a server system comprising at least one server via a network by streaming, the terminal comprising:
means for receiving from the server system comprising a first and a second storage area delivery of a first video content stored in the first storage area to play back the first video content;
means for receiving from the server system delivery of a list of title information of additional video contents stored in the second storage area to display the list, the additional video contents being separate from the first video content stored in the first storage area, and the title information of the additional video contents not being a part of or a transformation of the additional video contents;
means for receiving from the server system delivery of data for updating the list and displaying the updated list, where the updating is responsive to the additional video contents having been stored in the second storage area, such that a user who is watching the video contents is notified that the additional video contents have been stored in the second storage area;
means for receiving an input designating a second video content from the updated list to deliver a request of the second video content to the server system; and
means for playing back the second video content delivered from the server system in response to the request, wherein:
each of the video contents stored in the second storage area is related with attribute information;
the video contents in the list are selected from among the video contents stored in the second storage area based on the attribute information; and,
the attribute information comprises time attribute information; and the selection is made based on the time attribute information.

15. A non-transitory computer-readable data storage medium storing a computer program executed by a computer to perform a method of receiving video contents from a server system that comprises at least one server and delivers video contents via a network to clients by streaming, wherein the server system comprises a first storage area and a second storage area, and the method comprises:
receiving from the server system delivery of a first video content stored in the first storage area to play back the received first video content;
receiving from the server system delivery of a list of title information of additional video contents that have been stored in the second storage area to display the list, the additional video contents being separate from the first video content stored in the first storage area, and the title information of the additional video contents not being a part of or a transformation of the additional video contents;
receiving from the server system delivery of data for updating the list to display the updated list, where the updating is responsive to the additional video contents having been stored in the second storage area, such that a user who is watching the video contents is notified that the additional video contents have been stored in the second storage area;
receiving an input designating a second video content from the updated list to deliver a request of the second video content to the server system; and
playing back the second video content delivered by the server system in response to the request, wherein:
each of the video contents stored in the second storage area is related with attribute information;

the video contents in the list are selected from among the video contents stored in the second storage area based on the attribute information; and, the attribute information comprises time attribute information; and the selection is made based on the time attribute information.

16. The non-transitory computer-readable data storage medium according to claim 15, the method further comprising:

interrupting the playback of the first video content in response to the input; and restarting the playback of the first video content in response to completion of the playback of the second video content and according to a position where the playback of the first video content has been interrupted.

17. The non-transitory computer-readable data storage medium according to claim 15, wherein:

the attribute information comprises classification attribute information indicating a category that the video content belongs to; and the selection is made based on the classification attribute information.

18. A streaming delivery system for delivering video contents to a client via a network by streaming, comprising at least one server and at least one terminal, wherein the server comprises:

a first and a second storage area;

a streaming delivery controller that delivers video contents stored in the first storage area to the client via the network by streaming, and that stores additional video contents in the second storage area;

a list generator that generates a list of title information of at least one of the additional video contents stored in the second storage area, the additional video contents being separate from the video contents stored in the first storage area, and the title information of the additional video contents not being a part of or a transformation of the additional video contents;

a list transmitter that delivers the list to the client via the network; and a list update unit for generating data for updating the list and delivering the same to the client via the network, where the updating is responsive to the at least one of the additional video contents having been stored in the second storage area, such that a user who is watching the video contents is notified that the at least one of the additional video contents have been stored in the second storage area, and the terminal comprises:

a receiver that receives from the server delivery of the first video content stored in the first storage area to play back the first video content;

a receiver that receives from the server delivery of the list to display the list;

a receiver that receives from the server delivery of the data for updating the list to display an updated list;

an input device that receives an input designating a second video content from the updated list to deliver a request of the second video content to the server system; and a player that plays back the second video content delivered from the server system in response to the request, wherein:

each of the video contents stored in the second storage area is related with attribute information;

the video contents in the list are selected from among the video contents stored in the second storage area based on the attribute information; and, the attribute information comprises time attribute information; and the selection is made based on the time attribute information.

* * * * *